United States Patent [19]

Koshiga et al.

[11] 4,238,659
[45] Dec. 9, 1980

[54] PREVENTING MAGNETIZATION OF PIPE BLANK IN GMA WELDING

[75] Inventors: Fusao Koshiga, Kawasaki; Jinkichi Tanaka, Yokohama; Itaru Watanabe, Yokohama; Motoaki Suzuki, Yokohama; Toshifumi Kojima, Yokohama; Hiroyoshi Matsubara, Fukuyama; Tatsumi Osuka, Fukuyama; Kenji Takeshige, Fukuyama; Takashi Nagamine, Fukuyama; Osamu Hirano, Fukuyama, all of Japan

[73] Assignee: Nippon Kokan Kabushiki Kaisha, Tokyo, Japan

[21] Appl. No.: 11,412

[22] Filed: Feb. 12, 1979

Related U.S. Application Data

[63] Continuation of Ser. No. 772,592, Feb. 28, 1977, abandoned.

[30] Foreign Application Priority Data

Mar. 24, 1976 [JP] Japan ................................. 51-31393

[51] Int. Cl.³ .............................................. B23K 31/06
[52] U.S. Cl. ........................................ 219/61; 219/66; 219/74; 219/123
[58] Field of Search ................. 219/60 R, 61, 66, 122, 219/123, 137 R, 74

[56] References Cited

U.S. PATENT DOCUMENTS 3,171,944  3/1965  Linnandor ...................... 319/137 R

FOREIGN PATENT DOCUMENTS 2162567  7/1973  France ..................................... 219/123

*Primary Examiner*—E. A. Goldberg
*Attorney, Agent, or Firm*—Frishauf, Holtz, Goodman & Woodward

[57] ABSTRACT

In longitudinally seam-welding a pipe-blank for welded steel pipe from the inside along a groove by the GMA welding process which comprises using direct electric current supplied to a plurality of consumable electrodes in tandem through at least one cable as the welding current, at least two even-numbered consumable electrodes are used, half of said consumable electrodes being connected to said direct current so as to be positive in polarity and the remaining half of said consumable electrodes being connected to said direct current so as to be negative in polarity, to enable lines of magnetic force produced by said direct electric current for welding flowing through said at least one cable introduced into said pipe-blank to cancel each other, thereby preventing magnetization of said pipe-blank and the resulting magnetic arc blow of the welding arc.

3 Claims, 6 Drawing Figures

PREVENTING MAGNETIZATION OF PIPE BLANK IN GMA WELDING

This is a continuation of application Ser. No. 772,592 filed Feb. 28, 1977 now abandoned.

FIELD OF THE INVENTION

The present invention relates to an improvement in the method for longitudinally seam-welding a pipe-blank for welded steel pipe from the inside along a groove or cleft by the metal arc welding process comprising using direct electric current supplied to a plurality of consumable electrodes in tandem through at least one cable as the welding current, said improvement giving a beautiful and sound weld free from welding defects.

BACKGROUND OF THE INVENTION

Conventionally, in longitudinally seam-welding, for manufacturing a welded steel pipe, the groove or cleft of an O-shaped plate (hereinafter called "pipe-blank"), formed into a cylindrical shape by a forming process such as the U-O process (abbreviation of the U-ing/O-ing process) and the bending roll process, as shown in the schematic side view given in FIG. 1 for example, it is the usual practice of welding to employ an inside welding machine equipped with a welding torch 1 attached to the free end of a boom 2 having a length at least equal to that of a pipe-blank 3 to be welded, the fixed end of said boom 2 being fixed to a carriage 4; to insert said boom 2 into said pipe-blank 3 in advance; and, to longitudinally seam-weld said pipe-blank 3 from the inside along the groove or cleft with a consumable electrode 5 fed through said welding torch 1, while moving said boom 2 by said carriage 4, together with a cable 9 serving to supply welding current to said consumable electrode 5, in the withdrawal direction from said pipe-blank 3, i.e., in the welding direction as indicated by an arrow in the drawing. An inside welding machine equipped with two welding torches 1 and 1, leading and trailing, and two consumable electrodes 5 and 5 is represented in FIG. 1. However, an inside welding machine may have one welding torch and one consumable electrode, or it may be provided with more than two welding torches and more than two consumable electrodes.

In the aforementioned conventional welding method of a pipe-blank, when adopting a welding process comprising using direct electric current as the welding current with a consumable electrode as the anode, such as the reverse-polarity GMA welding process (GMA welding process is the abbreviation of the gas metal arc welding process which comprises carrying out welding while shielding a molten metal and a welding arc produced in the space between the base metal and the consumable electrode from open air with shielding gases such as an inert gas and a carbon dioxide gas), as shown in the partially enlarged schematic drawing given in FIG. 2, the welding arc 6 from the consumable electrode 5 is deflected toward the upstream side of the welding direction as indicated by an arrow in the drawing, i.e., in the opposite direction to that of welding, and takes the form as if it is drawn in by the molten metal 7. When the welding arc 6 takes the form as if it is drawn in by the molten metal 7 as mentioned above, the plasma jet stream produced at the tip of the consumable electrode 5 is also deflected toward the molten metal 7 and acts on said molten metal 7 as a dynamic pressure. This pushes said molten metal 7 away toward the upstream side of the welding direction, i.e., in the opposite direction to that of welding. As a result, the space below the consumable electrode 5 becomes substantially dry without molten metal, thus impairing the affinity between molten droplets from the consumable electrode 5 and the base metal at the groove of the pipe-blank 3. Welding defects such as undercut of bead, humping bead and lack of fusion of base metal thus tend to easily occur. In addition, frequent occurrence of boiling and spattering in the molten metal 7 tends to result in a deteriorated appearance of the weld bead. When the welding arc 6 is deflected as described above, furthermore, the tip of the consumable electrode 5 is melted only on one side as shown in FIG. 2. Under such circumstances, the transfer mode of molten droplets from the consumable electrode 5 cannot be a desirable spray transfer, but takes an undesirable mixed form of globular transfer and short-circuit transfer. As a result, coarse spatters are splashed with a crackling short-circuiting noise and are deposited on the weld bead surface, thus leading to a deteriorated appearance of the weld bead. What is worse, splashed spatters are deposited on the opening at the tip of the shielding nozzle (not shown) of the welding torch to disturb the gas shield and entangle the air. In this case, it may practically be impossible to carry out welding.

The above-mentioned deflection of the welding arc toward the upstream side of the welding direction, i.e., in the opposite direction to that of welding and the resulting irregular weld bead and welding defects are not limited only in the case of the conventional GMA welding process, but occur also in the case of the submerged arc welding process using direct electric current as the welding current. In both cases, it has been difficult to obtain a beautiful and sound weld free from welding defects.

SUMMARY OF THE INVENTION

An object of the present invention is therefore to provide an improvement in the method for longitudinally seam-welding a pipe-blank for welded steel pipe from the inside along a groove or cleft by the GMA welding process which comprises using direct electric current applied to a plurality of consumable electrodes through at least one cable as the welding current, said improvement being capable of giving a beautiful and sound weld free from welding defects.

Another object of the present invention is to prevent the occurrence of the magnetization of a pipe-blank for welded steel pipe and the resulting magnetic arc blow of the welding arc, in longitudinally seam-welding said pipe-blank from the inside along the groove by said GMA welding process.

In accordance with one of the features of the present invention, there is provided an improvement in the welding method which comprises applying the GMA welding process comprising using direct electric current supplied to a plurality of consumable electrodes in tandem through at least one cable as the welding current, and longitudinally seam-welding a pipe-blank for welded steel pipe from the inside along a groove with said respective consumable electrodes fed through a plurality of welding torches in tandem, while moving a boom through said pipe-blank relative thereto in the same direction as that of welding, said boom being equipped with said welding torches at the free end thereof and having a length at least equal to that of said pipe-blank; said improvement comprising the steps of: using at least two even-numbered consumable electrodes, connecting half of said consumable electrodes to said direct electric current so as to be positive in polarity, and connecting the remaining half of said consumable electrodes to said direct electric current to be negative in polarity, to thereby enable lines of magnetic force produced by said direct electric current for welding flowing through said at least one cable introduced into said pipe-blank to cancel each other, thereby preventing magnetization of said pipe-blank.

DETAILED DESCRIPTION OF PREFERRED EMBODIMENTS

With a view to making basic considerations on the irregular weld bead and welding defects such as undercut of bead, humping bead; lack of fusion of base metal and spattering, observed in longitudinally seam-welding a pipe-blank for welded steel pipe from the inside along a groove or cleft by the conventional welding process as mentioned above, and to clarifying causes thereof, the present inventors have made intensive studies. As a result, it has been found that the occurrence of said irregular weld bead and welding defects is attributable to the deflection of a plasma jet stream toward a molten metal caused by the deflection of a welding arc, and also that said deflection of the welding arc is brought about by a line of magnetic force produced by the direct electric current for welding flowing through a cable introduced into the pipe-blank.

Figure 3:
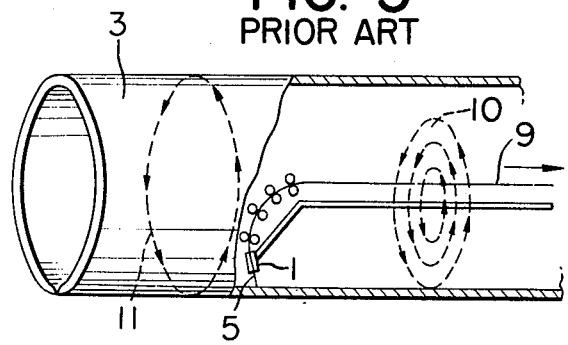
FIG. 3 is a partial cutaway schematic side view illustrating a form of welding in longitudinally seam-welding a pipe-blank for welded steel pipe from the inside along a groove by said conventional reverse-polarity GMA welding process.

More specifically, for instance, in longitudinally seam-welding a pipe-blank for welded steel pipe from the inside along a groove or cleft by the conventional reverse-polarity GMA welding as process comprising using direct electric current as the welding current with a consumable electrode as the anode, direct electric current for welding flows, as shown in the partial cutaway schematic side view given in FIG. 3, in the opposite direction to that of welding indicated by an arrow in the drawing, through a cable 9 introduced into the pipe-blank 3. Therefore, a line of magnetic force 10, which is clockwise as viewed from the right-hand side of the drawing, is produced by said direct electric current, and a strong magnetic field is formed around said cable 9. As a result, said pipe-blank 3 is strongly magnetized in the same clockwise direction 11 as that of the line of magnetic force 10 by said magnetic field, thus causing leakage of a strong line of magnetic force from the groove of said pipe-blank 3, and a strong magnetic field is formed at said groove. When welding a groove where such a strong magnetic field is formed, the welding arc from a consumable electrode 5, which is a flow of charged corpuscle, is deflected by said strong magnetic field at the groove. This phenomenon is called the magnetic arc blow of the welding arc.

Figure 1:
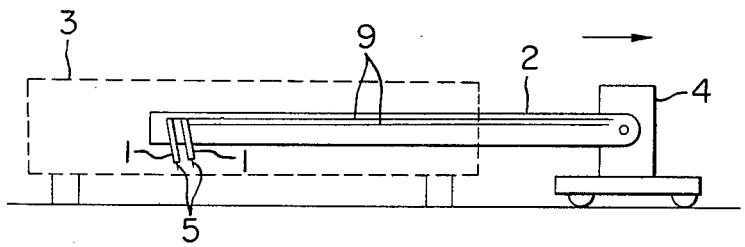
FIG. 1 is a schematic side view illustrating a conventional method for longitudinally seam-welding a pipe-blank for welded steel pipe from the inside along a groove and an apparatus for the implementation thereof.
Figure 2:
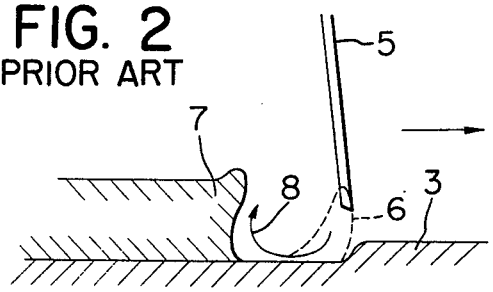
FIG. 2 is a partially enlarged schematic drawing illustrating a form of welding in the conventional reverse-polarity GMA welding process comprising using direct electric current as the welding current with a consumable electrode as the anode.
Figure 4A:
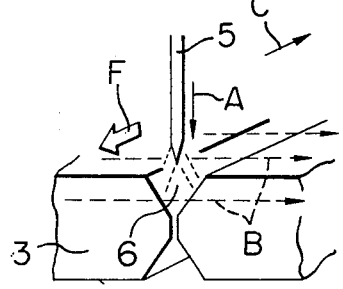
FIGS. 4(a) and 4(b) are vector diagrams illustrating the relation between the direction of the electric current flowing through a welding arc, magnetizing direction at the groove of a pipe-blank for welded steel pipe, and the direction of the force acting on said welding arc at said groove in said conventional reverse-polarity GMA welding process.
Figure 4B:
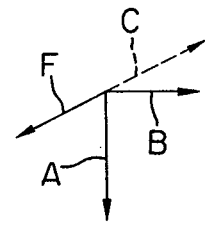

The relation between the direction of the electric current flowing through a welding arc, magnetizing direction at the groove of a pipe-blank and the direction of the force acting on said welding arc at said groove is illustrated in the vector diagrams of FIGS. 4(a) and 4(b). In these drawings, A is the direction of the electric current flowing in the welding arc 6 through the consumable electrode 5; B is the magnetizing direction at the groove of the pipe-blank 3; C is the welding direction; and F is the direction of the force acting on said welding arc 6. As shown in FIGS. 4(a) and 4(b), the direction F of the force acting on the welding arc 6 is the same as that of the direct electric current for welding flowing through the cable 9 (refer to FIG. 3) and is opposite to the welding direction C. As described above with reference to FIG. 2, therefore, the welding arc 6 is deflected toward the upstream side of the welding direction C, i.e., in the opposite direction to that of welding C, thus resulting in such irregular weld bead and welding defects as undercut of bead, humping bead, lack of fusion of base metal and spattering.

The present invention, which has been made based on the aforementioned finding, enables, in longitudinally seam-welding a pipe-blank for welded steel pipe from the inside along a groove or cleft by the conventional GMA welding process which comprises using direct electric current supplied to a plurality of consumable electrodes in tandem through at least one cable as the welding current, lines of magnetic force produced by said direct electric current for welding flowing through said cables introduced into said pipe-blank to cancel each other, by using at least two even-numbered consumable electrodes, connecting half said consumable electrodes in the reverse-polarity manner, i.e., to be positive in polarity, and connecting the remaining half in the straight-polarity manner, i.e., to be negative in polarity, thereby preventing magnetization of said pipe-blank and the resulting magnetic arc blow of the welding arc.

More specifically, in the method of the present invention, the conventional GMA welding process is applied, which comprises using direct electric current supplied to a plurality of consumable electrodes in tandem through cables as the welding current. As shown in the schematic side view of FIG. 5, a boom 2, having a length at least equal to that of a pipe-blank to be welded 3, equipped with a leading welding torch 1a and a trailing welding torch 1b in tandem at the free end thereof, the fixed end thereof being fixed to a carriage (not shown), is inserted in advance into said pipe-blank 3 together with cables 9a and 9b. A leading consumable electrode 5a fed through said leading welding torch 1a is connected via said cable 9a in the reverse-polarity manner, i.e., to be positive in polarity, and a trailing consumable electrode 5b fed through said trailing welding torch 1b is connected via said cable 9b in the straight-polarity manner, i.e., to be negative in polarity. Said pipe-blank 3 is longitudinally seam-welded from the inside along the groove in the welding direction as indicated by an arrow 14 in the drawing, with said leading consumable electrode 5a and said trailing consumable electrode 5b, while withdrawing said boom 2, together with said cables 9a and 9b, from said pipe-blank 3 by said carriage.

Figure 5:
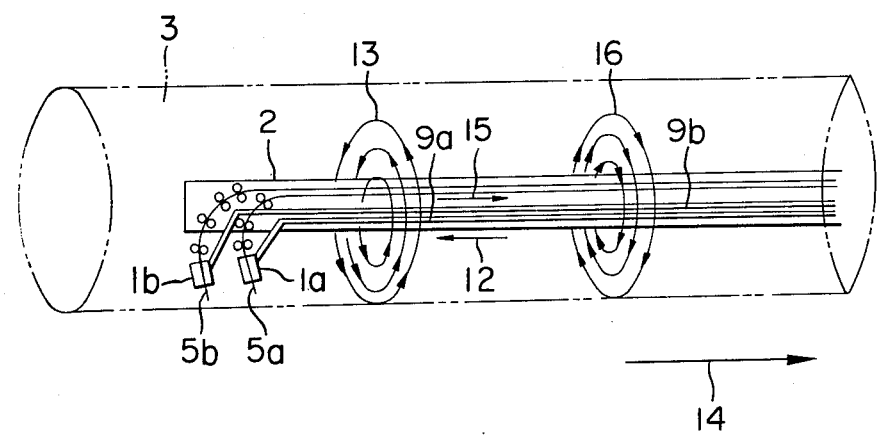
FIG. 5 is a schematic side view illustrating an embodiment of the method of the present invention.

In the aforementioned method of the present invention, as shown in FIG. 5, the direct electric current flowing through the cable 9a flows in the direction as indicated by an arrow 12 from right to left toward the consumable electrode 5a in the drawing. A clockwise line of magnetic force 13 as viewed from the right-hand side of the drawing is therefore produced by said direct electric current. On the other hand, the direct electric current flowing through the cable 9b flows in the direction as indicated by an arrow 15 from left to right from the consumable electrode 5b. A counter-clockwise line of magnetic force 16, just reverse in direction to said line of magnetic force 13, as viewed from the right-hand side of the drawing, is therefore produced by said direct electric current. Consequently, because of the difference in polarity between the leading consumable electrode 5a and the trailing consumable electrode 5b, the direction of the line of magnetic force 13 is opposite to that of the line of magnetic force 16. Therefore, said lines of magnetic force 13 and 16 cancel each other, and as a result, said pipe-blank 3 is hardly magnetized. It is thus possible to fully prevent the occurrence of the magnetic arc blow of the welding arc and the resulting irregular weld bead and welding defects such as undercut of bead, humping bead, lack of fusion of base metal and spattering.

The magnetization of a pipe-blank can be prevented also by another embodiment of the method of the present invention, which comprises, also with reference to FIG. 5, connecting, contrary to the foregoing, the consumable electrode 5a in the straight-polarity manner, i.e., to be negative in polarity, and the consumable electrode 5b, in the reverse-polarity manner, i.e., to be positive in polarity, and longitudinally seam-welding the pipe-blank 3 from the inside along the groove with said consumable electrodes 5a and 5b in the direction opposite to that indicated by the arrow 14, while inserting the boom 2, together with the cables 9a and 9b, into said pipe-blank 3 from the right-hand side of the drawing, by the carriage (not shown). In this case, it is clear that the consumable electrode 5b is the leading electrode, and the consumable electrode 5a, the trailing electrode.

In any of the aforementioned embodiments of the method of the present invention, it is possible to prevent the magnetization of a pipe-blank, and hence to prevent the occurrence of the magnetic arc blow of the welding arc and the resulting irregular weld bead and welding defects, even by connecting the leading consumable electrode in the straight-polarity manner, i.e., to be negative in polarity, and a trailing consumable electrode, in the reverse-polarity manner, i.e., to be positive in polarity. However, by connecting the leading consumable electrode in the reverse-polarity manner, i.e., to be positive in polarity, and the trailing consumable electrode, in the straight-polarity manner, i.e., to be negative in polarity, better results can be obtained, because of the easy availability of a deeper fusion penetration required on the leading electrode side.

Now, the method of the present invention is described in more detail by way of an example.

EXAMPLE

In longitudinally seam-welding two pipe-blanks for welded steel pipe, from the inside along a groove, having a wall thickness of 1 inch, an outside diameter of 48 inches and a length of 12 meters by the tandem-headed GMA welding process which comprises using direct electric current supplied to two leading and trailing consumable electrodes through cables as the welding current, the method of the present invention described above with reference to FIG. 5 was applied to a pipe-blank, said first method of the present invention comprising, also with reference to FIG. 5, inserting the boom 2 in advance into the pipe-blank 3 together with the cables 9a and 9b, said boom 2 being equipped with the leading welding torch 1a and the trailing welding torch 1b in tandem at the free end thereof and being fixed to the carriage (not shown) at the fixed end thereof, connecting the leading consumable electrode 5a fed through said leading welding torch 1a in the reverse-polarity manner, i.e., to be positive in polarity via said cable 9a, connecting the trailing consumable electrode 5b fed through said trailing welding torch 1b in the straight-polarity manner, i.e., to be negative in polarity via said cable 9b, and longitudinally seam-welding said pipe-blank 3 from the inside along the groove with said leading and trailing consumable electrodes 5a and 5b in the welding direction as indicated by the arrow 14 in the drawing, while withdrawing said boom 2, together with said cables 9a and 9b, from said pipe-blank 3 by said carriage. The conventional reverse-polarity GMA welding process, which is outside the scope of the present invention, was applied to the other pipe-blank for comparison purposes, said conventional method comprising the same steps as those mentioned above except for the step of connecting both the above-mentioned leading consumable electrode and the trailing consumable electrode in the reverse-polarity manner, i.e., to be positive in polarity.

Figure 6:
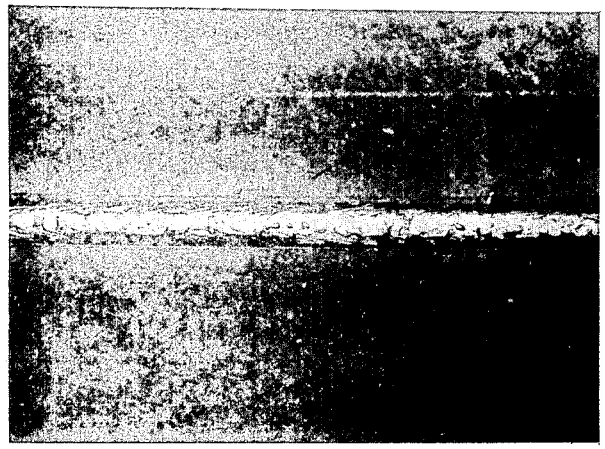
FIG. 6 is a photograph showing the state of a weld bead obtained by said conventional reverse-polarity GMA welding process.
Figure 7:
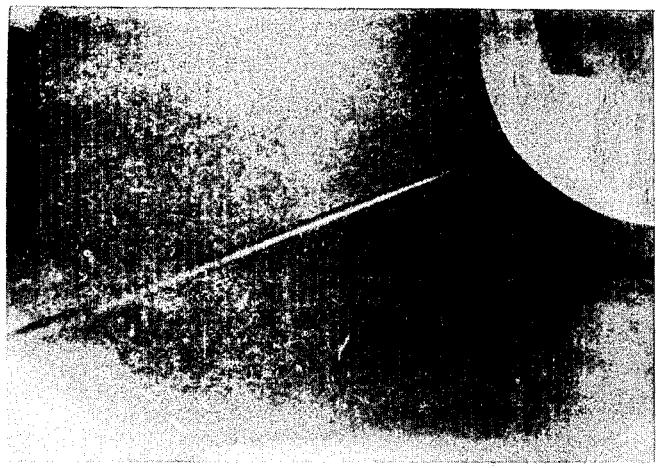
FIG. 7 is a photograph showing the state of a weld bead obtained by a method of the present invention.

The state of the weld beads obtained as a result is shown in photographs of FIGS. 6 and 7.

In the weld bead obtained by the conventional reverse-polarity GMA welding process, as shown in the photograph of FIG. 6, not only is the appearance poor, but the X-ray test revealed such welding defects as lack of fusion of base metal and undercut of bead. This is attributable to the occurrence of boiling of the molten metal caused by the magnetic arc blow of the welding arc toward the upstream side of the welding direction i.e., in the opposite direction to that of welding.

The weld bead obtained by the method of the present invention, in contrast, has a beautiful appearance as shown in the photograph of FIG. 7, with no trace of welding defects observed even by the X-ray test and an ultrasonic flaw detection test, thus permitting ascertainment that a very sound weld can be obtained by the first method of the present invention.

Similarly good results have been obtained also by another embodiment of the method of the present invention, which comprises, also with reference to FIG. 5, connecting, contrary to the foregoing, the consumable electrode 5a in the straight-polarity manner, i.e., to be negative in polarity, and the consumable electrode 5b, in the reverse-polarity manner, i.e., to be positive in polarity, and longitudinally seam-welding the pipe-blank 3 from the inside along the groove with said consumable electrodes 5a and 5b in the direction opposite to that indicated by the arrow 14, while inserting the boom 2, together with the cables 9a and 9b, into said pipe-blank 3 from the right-hand side of the drawing, by the carriage (not shown). In this case, the consumable electrode 5b is the leading electrode, and the consumable electrode 5a, the trailing electrode.

The above description of the method of the present invention has covered only the case where a pipe-blank is fixed while moving only a boom equipped with welding torches in tandem. The essential requirement in the present invention is however in that the welding torches move relative to the pipe-blank in the welding direction. Therefore, the method of the present invention covers also cases in which the pipe-blank is moved while fixing the boom equipped with the welding torches. In other words, in the method of the present invention, it suffices to move through said pipe-blank relative thereto the boom equipped with the welding torches in the welding direction.

According to the method of the present invention, as described above in detail, in longitudinally seam-welding a pipe-blank for welded steel pipe from the inside along a groove by the GMA welding process which comprises using direct electric current supplied to a plurality of consumable electrodes through at least one cable as the welding current, it is possible to fully prevent occurrence of the magnetization of said pipe-blank caused by the direct electric current flowing through said at least one cable introduced into said pipe-blank and the resulting magnetic arc blow of the welding arc, and therefore to obtain a beautiful and sound weld bead, thus providing industrially useful effects.

What is claimed is:

1. In a welding method for longitudinally seam-welding a pipe-blank from the inside thereof using the GMA welding process comprising supplying direct electric current as the welding current to an even number of consumable electrodes in tandem through current supply cables, said cables extending substantially parallel in substantially the same direction, half of said consumable electrodes being connected to said direct electric welding current so as to be positive polarity consumable electrodes and the remaining half of said consumable electrodes being connected to said direct electric welding current so as to be negative polarity consumable electrodes; and longitudinally seam-welding the pipe-blank for welded steel pipe from the inside along a cleft or groove by feeding said respective consumable electrodes through a respective even number of welding torches in tandem, while moving a boom carrying said welding torches through said pipe-blank relative to said pipe-blank in the same direction as that of welding, said boom having a free end which carries said welding torches and having a length at least equal to that of said pipe-blank;

the improvement comprising preventing circumferential magnetization of substantially the complete pipe-blank over substantially the entire length thereof and obtaining deeper fusion penetration by:

introducing said current supply cables from the same end of said pipe-blank into said pipe-blank substantially parallel to the axial line of said pipe-blank;

arranging said positive polarity consumable electrodes as leading electrodes in said direction of welding;

arranging said negative polarity consumable electrodes as trailing electrodes in said direction of welding; and, applying said direct electric welding current to said current supply cables for carrying out the GMA welding process to seam-weld said pipe blank from the inside with said electrodes to form a pipe so that the lines of magnetic force produced along the circumference of said pipe-blank by said direct electric welding current flowing through said current supply cables cancel each other, thereby preventing said circumferential magnetization of said pipe-blank, and also obtaining a deeper fusion penetration required on the leading electrode side.

2. The method as claimed in claim 1, the improvement further comprising the steps of inserting said boom in advance into said pipe-blank together with said current supply cables, and longitudinally seam-welding said pipe-blank while withdrawing said boom, together with said current supply cables, from said pipe-blank relative thereto in the same direction as that of welding.

3. The method as claimed in claim 1, the improvement further comprising the steps of longitudinally seam-welding said pipe-blank while inserting said boom into said pipe-blank relative thereto, together with said current supply cables, in the same direction as that of welding.

* * * * *